US008217774B2

(12) United States Patent
Elias et al.

(10) Patent No.: US 8,217,774 B2
(45) Date of Patent: Jul. 10, 2012

(54) METHOD FOR CONTROLLING A LOCKING SYSTEM OF A MOTOR VEHICLE AND A MOTOR VEHICLE

(75) Inventors: Björn Elias, Hepberg (DE); Ruben Maier, Herbrechtingen (DE); Roland Haberl, Ingolstadt (DE); Ingo Ledendecker, Buxheim (DE); Martin Deinhard, Greding (DE); Andreas Stüber, Riedenburg (DE)

(73) Assignees: Audi AG, Ingolstadt (DE); Audi Electronics Venture GmbH, Gaimersheim (DE)

( * ) Notice: Subject to any disclaimer, the term of this patent is extended or adjusted under 35 U.S.C. 154(b) by 0 days.

(21) Appl. No.: 13/131,319

(22) PCT Filed: Nov. 18, 2009

(86) PCT No.: PCT/EP2009/008187

§ 371 (c)(1), (2), (4) Date: May 26, 2011

(87) PCT Pub. No.: WO2010/060557

PCT Pub. Date: Jun. 3, 2010

(65) Prior Publication Data

US 2011/0248844 A1 Oct. 13, 2011

(30) Foreign Application Priority Data

Nov. 26, 2008 (DE) ......................... 10 2008 059 104

(51) Int. Cl.
*B60Q 1/00* (2006.01)
*B60R 25/10* (2006.01)

(52) U.S. Cl. .................. 340/438; 340/5.72; 340/426.28; 307/10.2; 701/36

(58) Field of Classification Search ................. 340/5.72, 340/5.31, 426.1, 426.11, 426.13, 426.28, 340/430; 307/10.1, 10.2; 70/256; 180/287; 701/36

See application file for complete search history.

(56) References Cited

U.S. PATENT DOCUMENTS

| | | | | |
|---|---|---|---|---|
| 5,510,765 | A * | 4/1996 | Madau | 340/541 |
| 5,534,846 | A * | 7/1996 | Kuroda | 340/426.28 |
| 5,614,769 | A * | 3/1997 | Kuroda | 307/10.2 |
| 5,867,091 | A * | 2/1999 | Chard | 340/426.26 |
| 5,887,466 | A * | 3/1999 | Yoshizawa | 70/257 |

(Continued)

FOREIGN PATENT DOCUMENTS

DE 101 10 564 A1 10/2001

(Continued)

*Primary Examiner* — Brian Zimmerman
*Assistant Examiner* — An T Nguyen
(74) *Attorney, Agent, or Firm* — Henry M. Feiereisen; Ursula B. Day

(57) ABSTRACT

The invention relates to a method for controlling a locking system of a motor vehicle wherein, as the states of the locking system, there is an unlocked state, a locked state from which it is possible to switch to the unlocked state via at least a first operating element inside the vehicle, and a security state in which by simply activating a first operating element it is not possible to switch to the unlocked state. The aim of the invention is to propose a method that allows a person inside the motor vehicle to still leave the motor vehicle despite user activation of the security state without substantially easing the opening of the motor vehicle from the outside by an unauthorized third party. Four concepts are proposed that can all be implemented in combination to great benefit. They enable a person still inside the vehicle to leave the motor vehicle upon activation of the security state.

20 Claims, 3 Drawing Sheets

U.S. PATENT DOCUMENTS

| | | | | | |
|---|---|---|---|---|---|
| 5,900,823 | A * | 5/1999 | Coll-Cuchi | 340/5.64 |
| 5,965,953 | A * | 10/1999 | Ikeda et al. | 307/10.2 |
| 6,133,646 | A * | 10/2000 | Segawa et al. | 307/10.1 |
| 6,194,997 | B1 | 2/2001 | Buchner et al. | |
| 6,549,130 | B1 * | 4/2003 | Joao | 340/539.14 |
| 6,717,290 | B2 * | 4/2004 | Hirota et al. | 307/10.2 |
| 6,861,768 | B2 * | 3/2005 | Willats et al. | 307/10.2 |
| 6,879,058 | B2 * | 4/2005 | Lorenz et al. | 307/10.1 |
| 7,105,943 | B2 * | 9/2006 | Willats et al. | 307/10.1 |
| 7,336,001 | B2 * | 2/2008 | Ozawa et al. | 307/10.2 |
| 7,532,107 | B2 * | 5/2009 | Hara et al. | 340/426.1 |
| 7,642,669 | B2 * | 1/2010 | Spurr | 307/9.1 |
| 2002/0195878 | A1 * | 12/2002 | Willats et al. | 307/10.2 |
| 2003/0052538 | A1 * | 3/2003 | Lorenz et al. | 307/10.1 |
| 2003/0132667 | A1 * | 7/2003 | Willats et al. | 307/10.1 |
| 2003/0222758 | A1 * | 12/2003 | Willats et al. | 340/5.72 |
| 2004/0150509 | A1 * | 8/2004 | Dunn et al. | 340/5.72 |
| 2005/0258944 | A1 * | 11/2005 | Ozawa et al. | 340/426.1 |
| 2008/0000711 | A1 * | 1/2008 | Spurr | 180/289 |
| 2008/0234878 | A1 * | 9/2008 | Joao | 701/2 |
| 2011/0248844 | A1 * | 10/2011 | Elias et al. | 340/438 |

FOREIGN PATENT DOCUMENTS

DE 10 2004 014 649 10/2005

* cited by examiner

METHOD FOR CONTROLLING A LOCKING SYSTEM OF A MOTOR VEHICLE AND A MOTOR VEHICLE

CROSS-REFERENCES TO RELATED APPLICATIONS

This application is the U.S. National Stage of International Application No. PCT/EP2009/008187, filed Nov. 18, 2009, which designated the U.S. and has been published as International Publication No. WO 2010/060557 and which claims the priority of German Patent Application, Serial No. 10 2008 059 104.1, filed Nov. 26, 2008, pursuant to 35 U.S.C. 119(a)-(d).

BACKGROUND OF THE INVENTION

The invention relates to a method for controlling a locking system of a motor vehicle wherein states of the locking system are provided in form of an unlocked state, a locked state from which it is possible to switch to the unlocked state via at least a first operating element located inside the vehicle, and a safe state in which it is not possible to switch to the unlocked state by only activating a first operating element. The invention also relates to a corresponding motor vehicle.

Motor vehicles having locking systems with two different states, namely an unlocked state (frequently also referred to as UNLOCK state) and a locked state (LOCK state), are generally known. It has proven to be disadvantageous to use only these two states. Although the LOCK state makes it possible to lock a motor vehicle to the outside even if a person is inside the motor vehicle, so that the doors cannot be easily opened, for example on a dangerous street, a parked unoccupied vehicle is still vulnerable to manipulation by unauthorized third persons who are able to operate control elements intended to be used for switching from the locked state into the unlocked state from the outside, for example with tools. Such first control elements are, for example, the at least partially concealable doorknobs or light emitting diodes frequently arranged on the window which indicate the locked state of the doors, a LOCK-UNLOCK switch or simply the interior door handle which is operated for opening the door.

To prevent this, a locking system for a motor vehicle has been proposed, which has an additional locked state, namely the so-called safe state (frequently also SAFE or a Double-Lock state). The safe state which is activated, for example, when the motor vehicle is locked from the outside—by way of remote control or an external lock, also locks all the doors, but in addition does not allow the lock to be later overridden from the passenger compartment. Operation of a first control element therefore does not cause a change into the unlocked state. This makes it significantly more difficult for an unauthorized third person to open a parked unoccupied motor vehicle.

However, this results in an additional disadvantage. For example, it may happen that—intentionally or unintentionally—a person remains inside the motor vehicle when the locking system is transferred into the safe state. Because the first control elements are deactivated, the person remaining inside the motor vehicle has—with current motor vehicles—no possibility of exiting the vehicle.

It is therefore an object of the invention to provide a method which allows a person remaining inside the motor vehicle to still exit the motor vehicle in spite of user activation of the safe state, without making it significantly easier for an unauthorized third person to open the motor vehicle from the outside.

SUMMARY OF THE INVENTION

This object is solved with a method of the aforedescribed type according to the invention in that when an alarm system, in particular a passenger compartment monitoring system, is deactivated through initiation by a user, the locking system is generally switched only into the locked state, and/or that when a user initiates a transition from the unlocked state into the safe state, either a signal which automatically indicates the presence or absence of a person inside the motor vehicle is determined for a predetermined time interval, and if a signal indicating the presence of a person inside the motor vehicle is present, the locking system switches into the unlocked state or the locked state, or the locking system switches initially for a predetermined time interval into the locked state, whereafter it changes to the safe state, and/or if the locking system is in the safe state and a signal indicating the desire of a person inside the motor vehicle to exit the motor vehicle, in particular by operating a first control element, is detected, a signal indicating the presence or absence of a person inside the motor vehicle is automatically determined, and if the signal indicates that a person is inside the motor vehicle, the locking system switches into the unlocked state or the locked state, or if the locking system is in the safe state and a signal indicating the desire of a person inside the motor vehicle to exit the motor vehicle is detected, an instruction for action is outputted inside the motor vehicle via optical and/or acoustical output means, wherein when the instruction for action is carried out, the locking system switches into the unlocked state or the locked state.

Four concepts are therefore proposed, all of which can particularly advantageously be realized in combination. They make it possible for a person who is still inside the motor vehicle when the safe state is activated to exit the motor vehicle, thereby improving the safety.

The first concept according to the invention completely prevents the activation of the safe state, even when a signal is received indicating that a user wishes to activate the safe state, if an alarm system, in particular a passenger compartment monitoring system, was previously deactivated by the user, for example via a fourth control element. If a user knowingly and deliberately deactivates the alarm system via a dedicated control element, in particular the passenger compartment monitoring system, then it can be assumed that the user prevents the alarm caused by the person who is still inside the motor vehicle from sounding—it can therefore be assumed that such person is indeed present inside the vehicle. Particularly advantageously, a switch into the safe state is not performed even if the user would like to activate the safe state.

The second concept according to the invention can ultimately be divided into two sub-concepts which represent different, but in both cases advantageous approaches to the problem on which the invention is based. Both sub-concepts can be used alternatively. According to the first sub-concept, a signal indicating the presence or absence of a person inside the motor vehicle is automatically determined for a predetermined time interval if a user initiates a transition from the locked state into the safe state, and if a signal indicating the presence of a person inside the motor vehicle is detected, the locking system switches into the unlocked state or the locked state. Generally, two situations must be distinguished. On one situation, systems, in particular with at least one sensor, which are typically inactive in the safe state of the locking system and are therefore unable to receive measurement values, can be used to determine the signal indicating the presence or absence of a person inside the motor vehicle. One exemplary sensor is a seat-occupied mat. In this situation, according to the first sub-concept, deactivation of this at least one sensor is postponed for the predetermined time interval so that the signal indicating the presence or absence of a person inside the motor vehicle can be determined. In the other situation (optionally additionally), an already active alarm system, in particular a passenger compartment monitoring system, can be used to generate the signal indicating the presence or absence of a person inside the motor vehicle. The active alarm system is thereby used during the—generally short, for example between 20 seconds and 2 minutes, in particular 30 seconds, long—predetermined time interval not as a protection from unauthorized third persons, i.e., for triggering an alarm, but supplies the signal indicating the presence or absence of a person inside the motor vehicle. It will be assumed that only one person who was already present inside the motor vehicle at the time when the safe state was activated can be registered within the short predetermined time interval. Nevertheless, strictest safety criteria are maintained by always activating the safe state first.

According to the second sub-concept of the second concept, it is proposed to not immediately switch into the safe state during a user-initiated transition from the unlocked state into the safe state, but to first switch for a predetermined time interval into the locked state. A person still inside the motor vehicle can then during the predetermined time interval in the usual manner switch to the unlocked state by operating a first control element—in particular an at least partially concealed door knob, a door handle and/or a locking/unlocking switch—and still exit the motor vehicle. The predetermined time interval should be selected such that the user who initiated the transition into the safe state is likely still in the proximity of the motor vehicle, thereby eliminating the danger from unauthorized third persons and the like. For example, the predetermined time interval may have duration between 20 seconds and 2 minutes, in particular 30 seconds.

In a particularly advantageous embodiment of the method according to the invention by implementing the second concept, an optical and/or acoustical and/or haptic and/or olfactory warning may be outputted during at least part of the predetermined time interval. The person still inside the motor vehicle is then be made aware that possibly only a short time remains before it becomes at least more difficult to exit the motor vehicle due to the imminent activation of the safe state, or the person still inside the motor vehicle is advised to pay attention to the system responsible for acquiring the signal indicating the presence or absence of a person inside the motor vehicle. For example, a text message referring to the impending safe state can be outputted. Such text message, which may be outputted optically or acoustically, may have the following wording: "Attention, the vehicle will transition into a safe locked state. Leave the vehicle immediately."

If it can be determined with the second sub-concept that there is no longer a person inside the motor vehicle, then a signal indicating the presence or absence of a person inside the motor vehicle can be determined at the beginning of the predetermined time interval, whereby no warning message will be outputted if the signal indicates the absence of persons inside the motor vehicle. In this way, the—potentially annoying—warning message can be eliminated if it is almost certain that no person is actually locked inside the motor vehicle.

In a particularly advantageous embodiment of the second sub-concept of the second concept of the present invention, the locked state can be maintained during the predetermined time interval by operating at least a second control element, without switching into the safe state. Therefore, the transition into the safe state can be entirely prevented because a person is still left inside the motor vehicle, and only the locked state is maintained. The person left inside the motor vehicle must then only operate a second control element, whereby it should be noted that a first control element can also be used as the second control element. For example, if a locking/unlocking switch forms a second control element, a person remaining inside the vehicle can, for example, operate the switch as a second control element, thereby reliably preventing a transition into the safe state. The person can then exit the motor vehicle later at any desired time by operating a first control element and is never in danger. Particularly advantageously, the optional warning message in this embodiment can be augmented with a reference to the second control element. A text message may, for example, include the part: "Press the LOCK-UNLOCK switch to circumvent the safe locked state." During the predetermined time interval, the person in the passenger compartment of the motor vehicle can therefore suppress the automatic activation of the safe state or exit the motor vehicle. If no action is taken, the safe state is activated after the predetermined time interval.

The additional concepts of the method according to the invention relate to options enabling a person remaining inside a motor vehicle to deactivate the active safe state and hence exit the motor vehicle, even when the safe state is activated, while maintaining safety against unauthorized third persons. Initially, a signal indicating the desire of a person inside the motor vehicle to exit the motor vehicle is determined. While typically the majority of the electronic components of the motor vehicle are deactivated in the safe state, the locking system still monitors if an action which may express the desire of a person remaining inside the motor vehicle to exit the motor vehicle is performed inside the motor vehicle. In an advantageous embodiment, a signal indicating the operation of an interior door handle for opening a door of the motor vehicle and/or releasing a seat belt from the seat belt buckle can be used as a signal indicating that a person inside the motor vehicle wishes to exit the motor vehicle. Particularly advantageously, the operation of the door handle is primarily used as a trigger signal, because this represents a typical measure when a person wishes to exit the motor vehicle. However, because such signal could also be triggered by an unauthorized third person, for example with a suitable tool, this measure is not sufficient in the method according to the invention for changing the state of the locking system. For this reason, two variants are proposed in order to determine with the highest degree of safely if a person is indeed still present inside the motor vehicle, wherein the two variants can be used in combination.

In one situation, a signal indicating the presence or the absence of a person inside the motor vehicle can be determined automatically. It is hereby attempted to determine, without requiring an additional action from the person who may still be inside the motor vehicle, if the person is indeed inside the motor vehicle. This can be advantageously performed automatically with at least one sensor arranged in the interior of the motor vehicle. A sensor system of this type for monitoring the passenger compartment of the motor vehicle is known. For example, at least one seat-occupied mat and/or, if a signal indicating release of a seat belt from the seat belt buckle is not used as a sensor to indicate the intent of a person inside the motor vehicle to exit the motor vehicle, a sensor indicating insertion of the seat belt into a seat belt buckle and/or a camera and/or an ultrasound sensor can be used. These types of sensors are generally known and need therefore not be described here in detail. In particular, it will be readily understood how the presence or absence of a person inside the motor vehicle can be reliably detected with these sensors. As described above, sensors associated with monitoring a passenger compartment can also be employed.

As already mentioned, it is customary to deactivate most of the electronic components of a motor vehicle when switching into the safe state. Advantageously, this can be used with the method according to the invention by reactivating the sensor if at least the sensor was deactivated when switching into the safe state in response to a detected signal indicating that a person inside the motor vehicle wishes to exit the motor vehicle, and by determining the signal indicating the presence or absence of a person inside the motor vehicle by comparing sensor data acquired at the time of the deactivation of the sensor with sensor data acquired at the time of the reactivation. A person inside the motor vehicle will move—at the latest when indicating the intent to exit the motor vehicle; this is in contrast to a heavy object placed, for example, on a seat-occupied mat. This observation is advantageously used according to the invention by evaluating a deviation between the last sensor data measured just before the deactivation of the sensor and the sensor data measured during the reactivation. Advantageously, a differentiation is also made with respect to the type of change. Advantageously, the presence of a person can be inferred if the differences between the measured sensor data satisfy certain criteria. In particular, an unauthorized person operating from the outside with the intent to open the vehicle should thereby be prevented from performing manipulations inside the passenger compartment of the motor vehicle with the intent to thwart the sensors. For example, a long object could be used to press down on the seat or the like. The safety of the motor vehicle can be further enhanced by adjusting the conditions for a signal indicating the presence of a person inside the motor vehicle sensor-specific, i.e., by employing certain criteria. It will be understood that additional information from the sensor data themselves can be used to exclude or identify person-specific data. For example, when a camera is present in the passenger compartment, an image analysis or the like can be performed.

It should be noted that the manner in which the signal indicating the presence or absence of a person inside the motor vehicle is determined can generally also be used with the second concept according to the invention, e.g., when suppressing the alarm message.

Always, when it is determined that there is no signal indicating the presence of a person inside the motor vehicle or in general, if such automatic check is not contemplated, an instruction for action can generally be outputted inside the motor vehicle via optical and/or acoustical output means, wherein when this instruction is acted upon, a switch into the unlocked state or the locked state occurs. Such instruction for action describing a certain sequence of steps can be visualized, for example, on a display. In particular, a human-machine-interface can be used to transmit the instruction for action. Such instruction for action can be, for example, the operation of at least one third, in particular dedicated control element. For example, a person can be informed that a third control element which is difficult to reach, in particular from outside the motor vehicle, and which is optionally provided specifically for this situation, should be operated. Advantageously, the operation of several control elements may be provided to enhance safety. For example, one instruction may be: "Please open the glove compartment and operate the switch located at the upper left for deactivating the safe locked state." Alternatively, an instruction for action may also include inputting a sequence of characters on a keyboard and/or selecting menu items on the display or on a display. For example, an unlock code or the like may be requested. An unauthorized third person outside the motor vehicle is unable to perform such actions quickly enough.

A transition into the unlocked state or locked state takes place only after the sequence of actions described in the instruction for action has been performed In addition to the method, the invention also relates to a motor vehicle with a locking system having an unlocked state, a locked state which can be switched into the unlocked state via at least one first control element located inside the motor vehicle, and a safe state which cannot be switched into the unlocked state by merely operating a first control element, wherein the motor vehicle is configured for carrying out the method according to the invention. Inside the motor vehicle according to the invention, several or advantageously all of the aforementioned concepts can thus be realized, for example with at least one control device configured for this task, in particular a control device of the locking system, so that a person unintentionally or intentionally locked inside the vehicle can exit the vehicle unharmed at any time. At the same time, unauthorized persons will be totally denied access from the outside, for example by opening the motor vehicle.

BRIEF DESCRIPTION OF THE DRAWING

Additional advantages and details of the present invention can be inferred from the following description of exemplary embodiments and with reference to the drawings. It is shown in.

DETAILED DESCRIPTION OF PREFERRED EMBODIMENTS

Figure 1A:
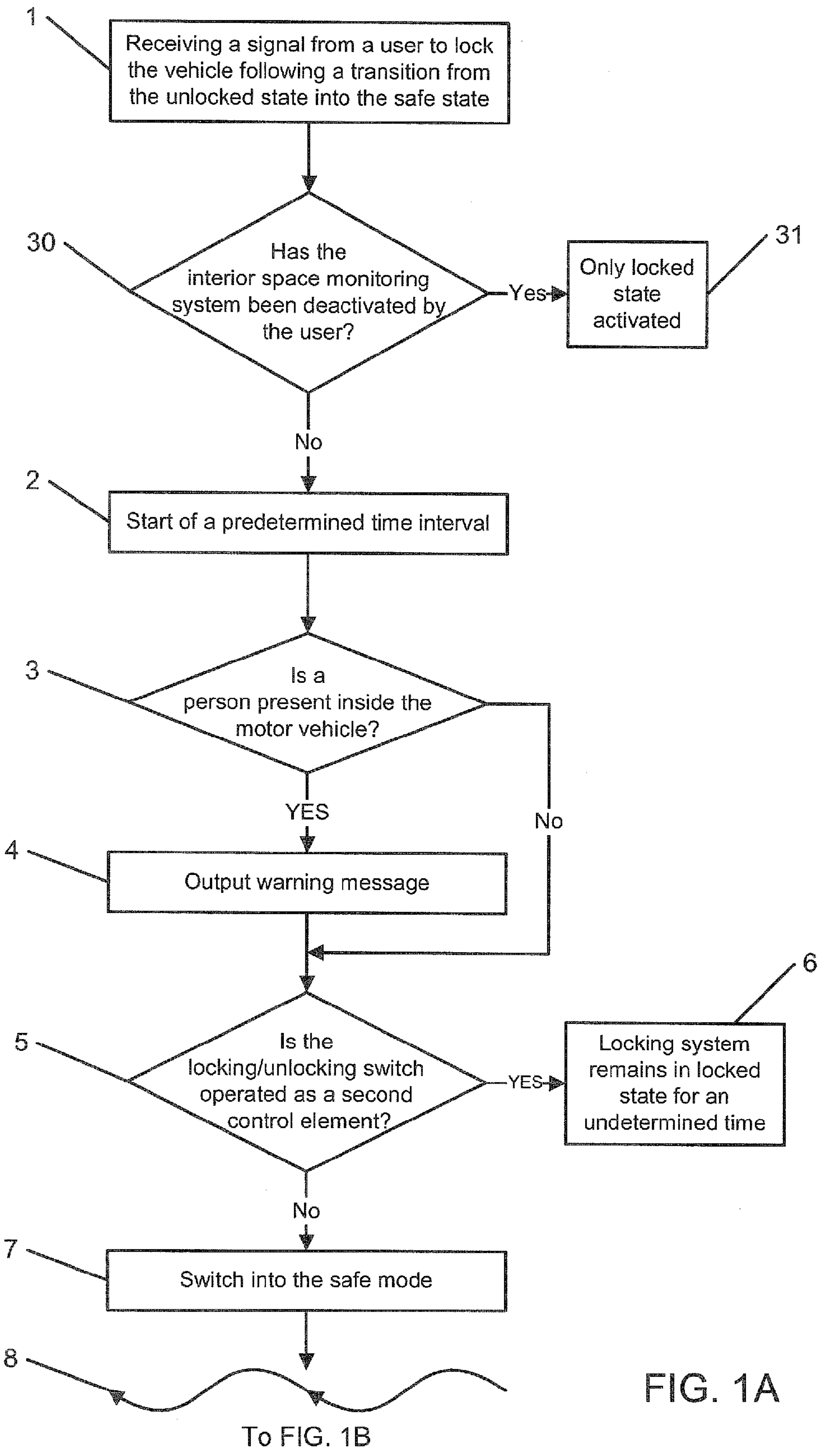
FIGS. 1A and 1B a schematic flow diagram of the method of the invention, and FIG. 2 a motor vehicle according to the invention.
Figure 1B:
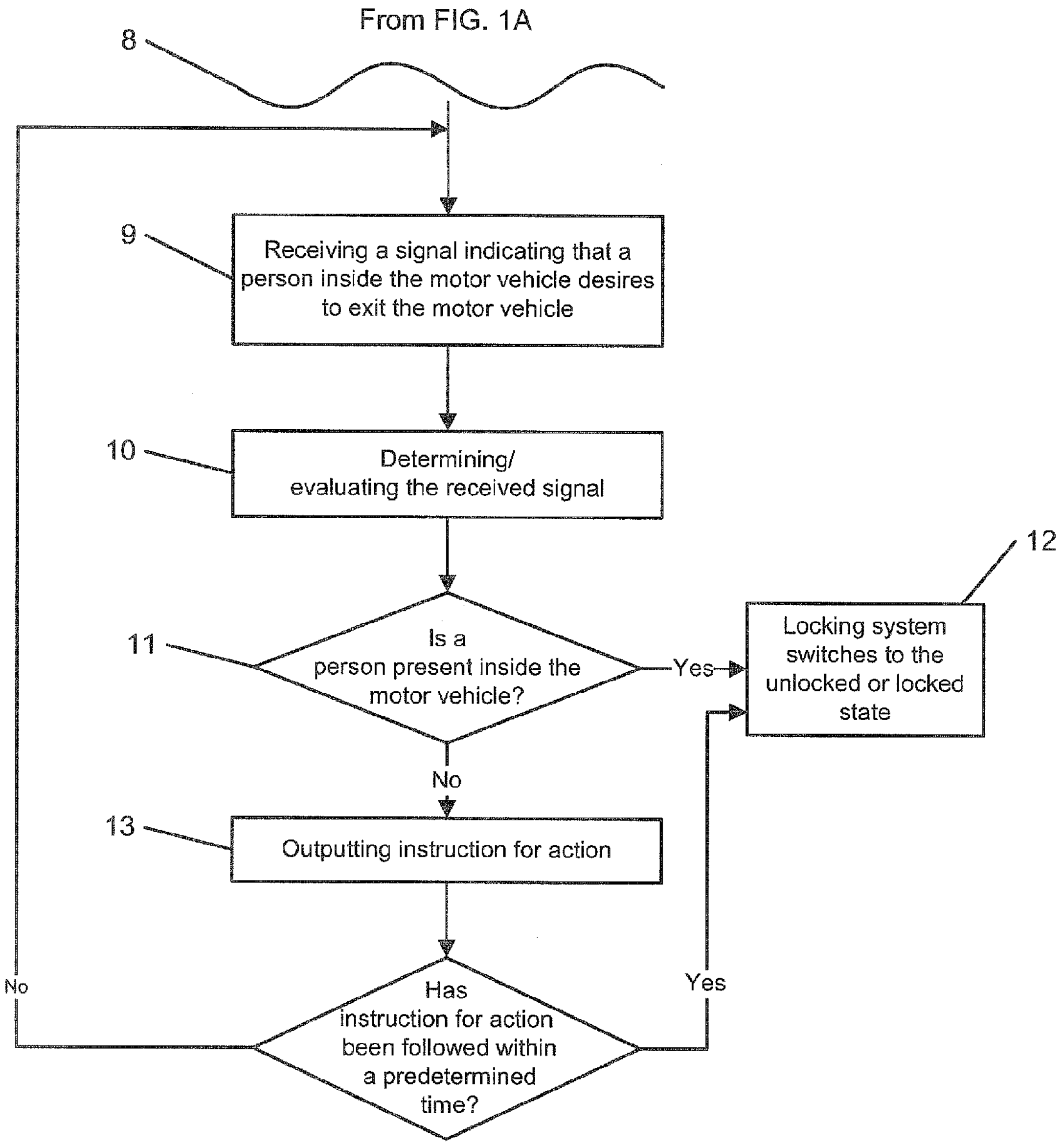

FIGS. 1A and 1B show a schematic flow diagram of the method of the invention, which is used to control a locking system of a motor vehicle. The states of the locking system are an unlocked state (UNLOCK state), a locked state (LOCK state) and a safe state (SAFE state). The locked state is distinguished from the safe state in that the locked state can be switched into the unlocked state via at least one first control element (door knobs, door handles and/or a locking/unlocking switch) arranged inside the motor vehicle.

In a step 1, a signal is received which, after a transition from the unlocked state into the safe state, indicates that a user, for example a user of the motor vehicle, wishes to lock the motor vehicle after exiting the motor vehicle by remote control by pressing a key element. According to the invention, it is first checked if the user has previously deactivated the passenger compartment monitoring system with a dedicated control element. Such switch for deactivating the passenger compartment monitor can be arranged, for example, in the driver-side door. If it is determined, at step 30, that the passenger compartment monitoring system has been deactivated by the user, then only the locked state is permanently activated at a step 31, so that a person remaining inside the motor vehicle can exit the motor vehicle at any time by using the first control elements.

However, even if at step 30 a user-initiated deactivation of the passenger compartment monitoring system has not been detected, a switch into the safe state does not immediately occur in the method illustrated in FIGS. 1A and 1B; instead, a predetermined time interval starts at step 2, in this exemplary embodiment 30 seconds, whereby the vehicle is initially brought into the locked state, step 2.

At a step 3, a signal indicating the presence or absence of a person inside the motor vehicle is determined. This can be done, for example, based on different sensors, for example seat-occupied mats, passenger compartment cameras, ultrasound sensors or the like. With a camera, for example, corresponding image processing is performed, whereas with a seat-occupied mat it is checked if the signal pattern corresponds to that of a person sitting on the respective seat. If it is determined that a person is potentially present inside the motor vehicle, then a warning message is outputted at a step 4; otherwise this step is skipped. It should be mentioned here that step 3 is optional and that, of course, the warning message may always be outputted, in particular if there remains an uncertainty with the employed sensors or variants for determining the presence of a person inside the motor vehicle.

As mentioned above, a warning message is outputted at step 4. In the present example, the following message is displayed on a display of the motor vehicle: "Attention, the vehicle will transition into a safe locked state. Exit the vehicle immediately or press the locking/unlocking switch in order to avoid the safe locked state." This message is acoustically enhanced. Optionally, a haptic and/or olfactory enhancement can also be contemplated.

A person still inside the motor vehicle has now several options. Initially, the person can—as is customary in the locked state—switch the motor vehicle into the unlocked state by operating a first control element, in the present example the door handle or the door knob, and then exit the motor vehicle. In addition, it is checked, at a step 5, if the locking/unlocking switch is operated as a second control element. This is also done only as long as the predetermined time interval persists. If the switch is operated, then the locking system remains in the locked state for an unspecified time, i.e., until the person or another person performs another action, step 6. The person may hence remain inside the motor vehicle although still being able, as known from the locked state, to unlock the motor vehicle by operating a first control element.

If during the predetermined time interval the motor vehicle is neither unlocked with a first control element nor is the locked state permanently switched by the second control element, then a switch into the safe mode occurs automatically after the predetermined time interval, step 7.

It should be noted here that according to the invention, instead of the steps 2-7, a different exemplary embodiment may also be contemplated which can be employed with equally favorably results. In this case, a switch into the safe state indeed occurs at the time of step 2; however, a predetermined time interval begins nevertheless. Within the predetermined time interval, here again 30 seconds, a signal indicating the presence or absence of a person inside the motor vehicle is determined similar to the steps 3-5. This can be accomplished—as will be described below with reference to the exemplary embodiment illustrated in FIG. 1 FIGS. 1A and 1B—by postponing the deactivation of sensors, for example a seat-occupied mat, as is typically during the safe state; in another situation, for example a passenger compartment monitoring system can advantageously also be employed, which is then used during the predetermined time interval not for triggering an alarm, but for recording the signal. If the presence of a person is indicated—by the sensors or the passenger compartment monitoring system—, then the locking system switches back into the locked or unlocked state, similar to step 6, allowing the person to exit the motor vehicle.

If at step 7 the motor vehicle is brought into the safe mode, then different electronic components inside the motor vehicle are deactivated, in particular also sensors used for determining a signal indicating the presence or absence of a person inside the motor vehicle. However, before these electronic components are deactivated, the most recent measured sensor data recorded by the components are stored.

The further process flow of the method illustrated in FIGS. 1A and 1B takes place at any time when the locking system is in the safe state. This is indicated by the discontinuity lines 8. During the entire time the motor vehicle remains in the safe state, it is monitored if a signal is generated indicating that a person inside the motor vehicle wishes to exit. In the present example, a circuit is active which checks if the door handle of the door of the motor vehicle is operated from the inside. Such operation of the door handle is interpreted as a desire of a person inside the motor vehicle to exit. At a step 9, such a signal has been received, whereafter components of the vehicle electronics are activated again, in particular sensors for determining a signal indicating the presence or absence of a person inside the motor vehicle. This signal is now determined at a step 10. The sensor data stored at step 7 during the deactivation—illustrated here for exemplary seat-occupied mats—are compared with the sensor data obtained at step 9 during the reactivation, in this case to check if the seat occupation is identical. If a person is inside the motor vehicle, it can be assumed that the person moves during this time and that the sensor data are actually changed. This concept can be, of course, also be applied to other sensors, for example ultrasound sensors. In addition, the state of a seat belt buckle may be detected, because changes would indicate the release or application of a seat belt during the meanwhile elapsed time. If a camera is used as a sensor, then the image analysis may also be performed independent of changes or may even be applied as an additional criterion.

It should be noted that not every change is assumed to indicate the presence of a person; instead, certain criteria must be satisfied. For example for a seat-occupied mat, this may be a certain signal distribution typical for a person sitting on the seat. By assuming that a person is present only when differences satisfy certain criteria, additional protection is introduced to foil manipulation.

The determined signal is then evaluated at step 11. If the signal indicates the presence of a person inside the motor vehicle, then a switch occurs at step 12 into the unlocked state or the locked state, allowing the person to exit. The steps 10 and 11 are executed completely automatically, meaning that the person is not required to perform additional activities to change the state of the locking system after indicating the desire to exit. If the signal determined at step 10 shows that no person appears to be inside the motor vehicle, then the method of the invention in this exemplary embodiment still contemplates an additional safety method by outputting, at a step 13, on the display, optionally with acoustic emphasis, an instruction for action in form of a text. An instruction for action includes a sequence of actions to be performed in order to leave the safe state. Several possibilities can be envisioned. An instruction for action may include inputting a character sequence, for example a code; however, a certain menu item may also be selected on a human-machine-interface. It is also conceivable that the instruction for action indicates that at least one third control element should be operated. The third control element may be, in particular, a dedicated control element which, in particular, may be concealed, for example in the glove compartment, or arranged so that it is difficult to reach.

It is then checked, at a step 14, if the instruction for action has been followed within a predetermined time, meaning that the sequence of actions was performed. If this is the case, then a switch into the locked state or unlocked state occurs, also at step 12. If the instruction for action is not followed, then a switch back into the normal safe state occurs after the predetermined time, so that for example a person performing manipulations on the outside is prevented from changing the state. The predetermined time can have the same duration as the predetermined time interval.

Figure 2:
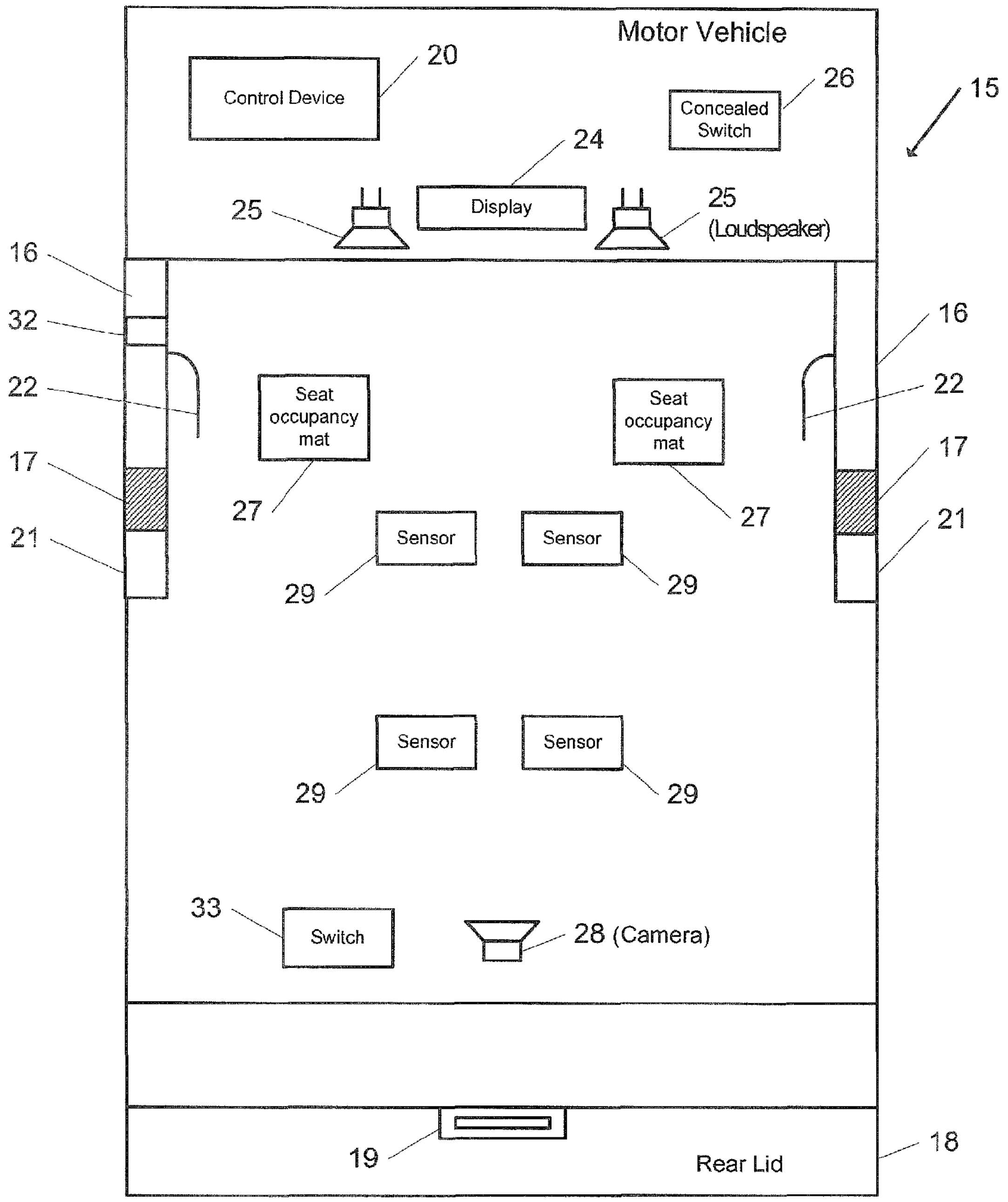

FIG. 2 finally shows a motor vehicle 15 according to the invention which is configured for carrying out the method of FIGS. 1A and 1B. The motor vehicle 15 has, for example, two front doors 16 with locking mechanisms 17 as well as a rear lid 18 with a locking mechanism 19. A central lock is provided, meaning that the locking mechanisms 17, 19 are centrally locked and/or unlocked by a control device 20. The control device 20 and the locking mechanisms 17, 19 form part of a locking system of the motor vehicle 15. The locking system has, as already discussed, three states, namely the unlocked state, the locked state and the safe state.

In addition, the motor vehicle 15 has several control elements associated with the locking system, which operate here particularly as first control elements. These are concealable doorknobs 21, door handles 22 and a locking/unlocking switch 23. In addition, a human-machine-interface with a display 24 and loudspeakers 25 is provided. The reference symbol 26 indicates a concealed switch in the glove compartment which can operate as a third control element. Finally, a switch 32 for deactivating a passenger compartment monitoring system, indicated with the reference symbol 33, is arranged in the driver-side door, wherein the switch may form a fourth control element.

Finally, a passenger compartment sensor system is arranged inside the motor vehicle 15, which includes in addition to seat-occupied mats 27 on the front seats a passenger compartment camera 28 as well as sensors 29 indicating insertion of a seat belt into a seat belt buckle.

Operation of the door handles 22 can also be detected. The door handles 22, the door knobs 21, the switch 23, the locking mechanisms 17, 19, the sensors 27, 28 and 29, the switch 26 and the output means, display 24 and loudspeakers 25, the switch 32 and the passenger compartment monitoring system 33 all communicate with the control device 20, making it possible to carry out the method according to the invention as described above.

The invention claimed is:

1. A method for controlling a locking system of a motor vehicle, said locking system having an unlocked state, a locked state and a safe state, wherein a switchover from the locked state into the unlocked state is enabled by operating a first control element, whereas a switchover from the safe state into the unlocked state is prevented when only the first control element is operated, the method comprising the steps of:

with an alarm system being deactivated by a user, allowing the locking system to switch only into the locked state, and with the locking system being switched by the user from the unlocked state into the safe state, automatically determining for a predetermined time interval a first signal indicating a presence or absence of a person inside the motor vehicle and switching the locking system into the unlocked state or the locked state, if the first signal indicates the presence of a person inside the motor vehicle, outputting a warning message indicating that the locking system will be transitioning from the locked state into the safe state, unless a second control element is activated within a predetermined time interval, whereas the locking system remains in the locked state if the second control element is activated, and with the locking system being in the safe state, when a second signal indicating that a person inside the motor vehicle wishes to exit the motor vehicle is detected, automatically determining a first signal indicating the presence or absence of a person inside the motor vehicle and if the first signal indicates that a person is present inside the motor vehicle, switching the locking system into the unlocked state or the locked state, or outputting inside the motor vehicle an instruction for action via optical and/or acoustical output means, and switching the locking system into the unlocked state or the locked state after the instruction for action is executed within a predetermined time.

2. The method of claim 1, wherein the second signal is generated by operating the first control element.

3. The method of claim 1, wherein a warning message selected from the group of an optical warning message, an acoustical warning message, a haptic warning message and an olfactory warning message is outputted during at least a portion of the predetermined time interval.

4. The method of claim 3, wherein the warning message comprises a text message indicating that the safe state is activated or that a switch into the safe state is imminent.

5. The method of claim 3, wherein when the locking system switches into the locked state for the predetermined time interval, the first signal indicating the presence or absence of a person inside the motor vehicle is determined at a beginning of the predetermined time interval, and no warning message is outputted if the first signal indicates the absence of persons inside the motor vehicle.

6. The method of claim 1, wherein when the locking system switches into the locked state for the predetermined time interval, the locked state is maintained by operating at least one second control element during the predetermined time interval, preventing switching into the safe state.

7. The method of claim 1, wherein the predetermined time interval has a duration between 20 seconds and 2 minutes.

8. The method of claim 7, wherein the predetermined time interval has a duration of approximately 30 seconds.

9. The method of claim 2, wherein the first control element comprises an interior handle for opening a door of the motor vehicle or a release of a seat belt from the seat belt buckle, or both.

10. The method of claim 1, wherein the second signal is automatically determined with at least one sensor arranged inside the motor vehicle.

11. The method of claim 1, wherein the second signal is generated by at least one of a seat-occupied mat, a sensor indicating insertion of a seat belt into a seat belt buckle, a camera and an ultrasonic sensor.

12. The method of claim 10, wherein if the at least one sensor is deactivated during switchover into the safe state, the at least one sensor is reactivated when the second signal is detected, and wherein the first signal is derived from a comparison of sensor data recorded at a time the at least one sensor was deactivated with sensor data recorded at a time the at least one sensor is reactivated.

13. The method of claim 10, wherein at least one sensor is associated with a passenger compartment monitoring system.

14. The method of claim 1, wherein the instruction for action is displayed on a display.

15. The method of claim 1, wherein the instruction for action includes operating at least one third control element.

16. The method of claim 15, wherein third control element is dedicated control element.

17. The method of claim 15, wherein the at least one third control element comprises a keyboard or a display, or both, and the instruction for action includes inputting a symbol sequence via the keyboard or selecting menu items on the display.

18. The method of claim 1, wherein the alarm system is deactivated by the user via a fourth control element.

19. The method of claim 18, wherein the fourth control element is a dedicated control element.

20. A motor vehicle comprising a locking system having an unlocked state, a locked state and a safe state, wherein a switchover from the locked state into the unlocked state is enabled by operating a first control element located inside the motor vehicle, whereas a switchover from the safe state into the unlocked state is prevented when only the first control element is operated, wherein the locking system is configured to:

with an alarm system being deactivated by a user, switch exclusively into the locked state, and with the locking system being switched by the user from the unlocked state into the safe state, automatically determine for a predetermined time interval a first signal indicating a presence or absence of a person inside the motor vehicle and switch the locking system into the unlocked state or the locked state, if the first signal indicates the presence of a person inside the motor vehicle, or output a warning message indicating that the locking system will be transitioning from the locked state into the safe state, unless a second control element is activated within a predetermined time interval, whereas the locking system remains in the locked state if the second control element is activated, and with the locking system being in the safe state, when a second signal indicating that a person inside the motor vehicle wishes to exit the motor vehicle is detected, automatically determine a first signal indicating the presence or absence of a person inside the motor vehicle and if the first signal indicates that a person is present inside the motor vehicle, switch the locking system into the unlocked state or the locked state, or output inside the motor vehicle an instruction for action via optical and/or acoustical output means, and switch the locking system into the unlocked state or the locked state after the instruction for action is executed within a predetermined time.

* * * * *